United States Patent [19]

Bai et al.

[11] Patent Number: 5,176,047
[45] Date of Patent: Jan. 5, 1993

[54] TIRE DISMOUNTING TOOL FOR LARGE MOTOR VEHICLES

[76] Inventors: Dawn Bai, No. 6, Dzon-Yong Road, Taichung, Taiwan; Claude Huang, No. 57, Sec. 1, Sen-Lin Road, Da-Ya Hsiang, Taichung, Taiwan

[21] Appl. No.: 828,043

[22] Filed: Jan. 30, 1992

[51] Int. Cl.$^5$ ............................................. B25B 17/00
[52] U.S. Cl. .................................. 81/57.3; 81/57.31; 81/57.24
[58] Field of Search ................... 81/57.14, 57.24, 57.3, 81/57.31

[56] References Cited

U.S. PATENT DOCUMENTS

| | | | |
|---|---|---|---|
| 3,992,964 | 11/1976 | Osmond | 81/57.31 |
| 4,627,310 | 12/1986 | Coburn | 81/57.31 X |
| 4,869,139 | 9/1989 | Gotman | 81/57.14 X |

FOREIGN PATENT DOCUMENTS

| | | | |
|---|---|---|---|
| 1092399 | 11/1960 | Fed. Rep. of Germany | 81/57.3 |
| 965958 | 9/1950 | France | 81/57.31 |

*Primary Examiner*—D. S. Meislin
*Attorney, Agent, or Firm*—Browdy and Neimark

[57] ABSTRACT

A tire dismounting tool for large motor vehicles has a long cylindrical housing provided with a plurality of main bodies and covers. The interior of the housing is divided into a plurality of receiving spaces, each of which is provided therein with a drive member for imparting torsion and with a planetary gear. The housing is fastened to a support member of a predetermined length. A torsion of substantial magnitude sufficient to loosen the mounted nut of tire of a heavy motor vehicle can be generated by the product of speed ratios of planetary gears.

4 Claims, 4 Drawing Sheets

TIRE DISMOUNTING TOOL FOR LARGE MOTOR VEHICLES

BACKGROUND OF THE INVENTION

The present invention relates to a hand tool for use in motor vehicles, and more particularly to a tire dismounting tool for large motor vehicles.

A hand tool for use in loosening nuts from an automobile tire has been developed and disclosed. See, for example, U.S. Pat. No. 3,992,964 to Osmond, issued Nov. 23, 1976 and the patents referred to therein. The Osmond patent is designed basically for use with a small motor vehicle. It is therefore, not suitable for use in dismouting nuts from a tire of large motor vehicles such as trucks, semitrailers, buses, etc. The nuts mounted on the wheels of such large motor vehicles can be dismounted only by means of a tool capable providing substantial torsion sufficient to cause rotation of a mounted nut. As shown in FIGS. 3 and 4 of Osmond's patent specification, the dimensions of housing, planetary gears 26 and ring gear 24 are not large enough to generate a force capable of acting to cause the rotation of nuts mounted on the wheels of a large automotive vehicle such as a semitrailer. As a result, the diameters of the housing, planetary gears 26 and ring gear 24 of Osmond's invention must be increased several times so as to enable the tool to generate an adequate torsion. Such structural modification, as described above, of the tool disclosed by Osmond will no doubt result in a bulky housing, which is difficult for a user to operate.

SUMMARY OF THE INVENTION

It is therefore an object of the present invention to provide a tire dismounting tool, which is capable of generating a torsion large enough to dismount the fastened nuts of the wheels of large automotive vehicles, and which is handy to use.

According to the present invention, a tire dismounting tool for large motor vehicles includes a housing made up of a plurality of main bodies and covers, with its interior divided into a predetermined number of receiving spaces. A predetermined number of drive members are received respectively in front segments of said receiving spaces, with said drive member located at the front having a coupling portion intended to fasten with a socket of appropriate dimension, and with the rest of said drive members having at a front segment thereof an outer toothed portion extending into the rear segment of said receiving spaces. A predetermined number of planetary gear assembly are disposed respectively in said receiving spaces of said housing, each of said planetary gear assembly comprising; a ring gear disposed in inner wall of each main body of said housing; a plurality of planet gears equidistantly mounted between and meshing said ring gear and said outer toothed portion of said drive members, with the exception of said drive member located at the front; a rear drive member disposed in the last receiving space of said housing and provided at front segment thereof with an outer toothed portion engaging said planet gears of the last set of said planetary gear assembly, with rear segment thereof extending beyond said cover and having a coupling portion intended to couple with a lever; and a support member having an inner end fastened to a predetermined position in the periphery of said housing and further having an outer end serving as a sustaining means to rest on the ground.

This and other objects and advantages of the present invention, as well as the details of an illustrative embodiment, will be more fully understood from the following specification and drawings, in which:

DETAILED DESCRIPTION OF THE PREFERRED EMBODIMENT

Figure 1:
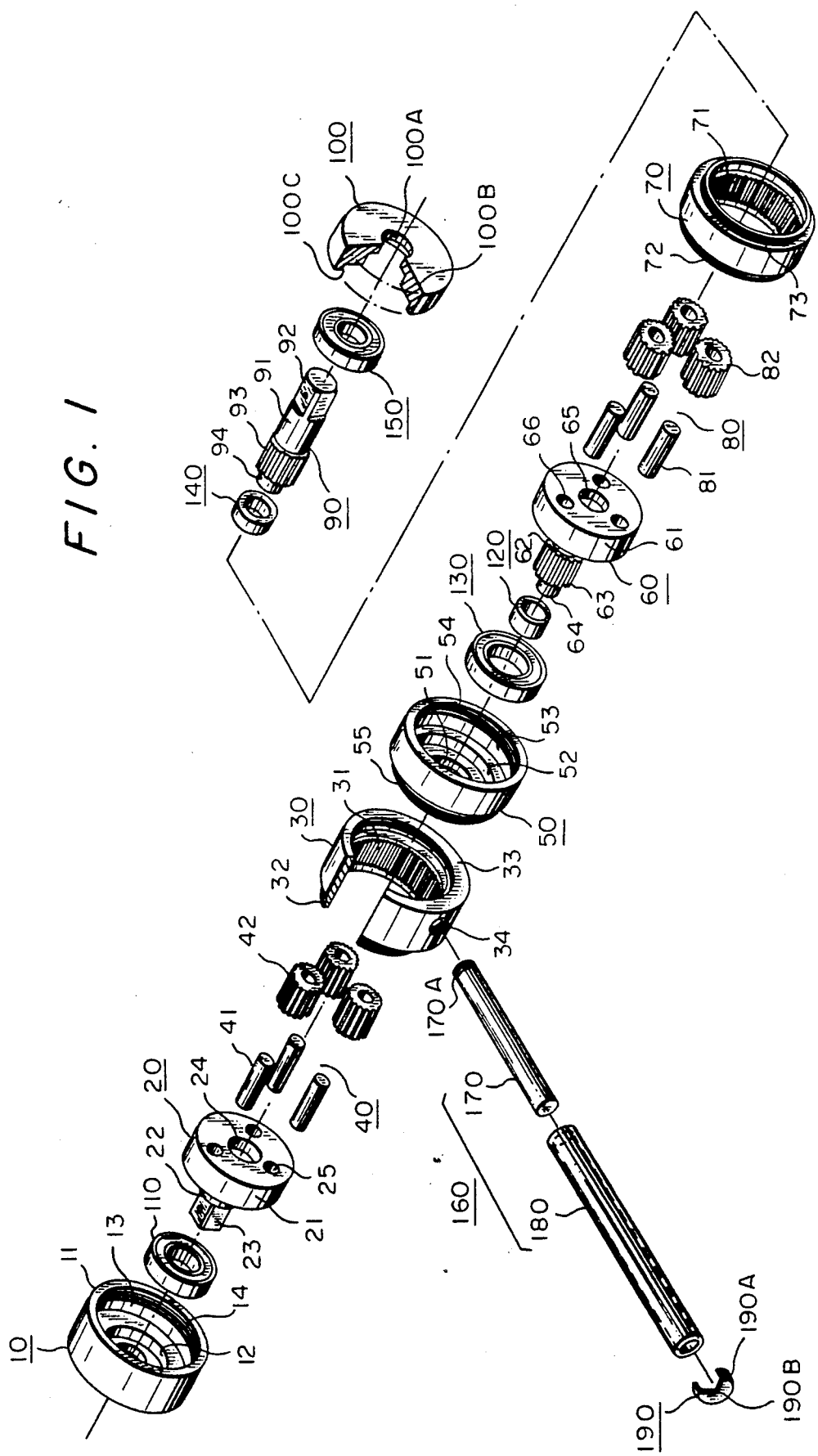
FIG. 1 is an exploded view showing a tire dismounting tool for large motor vehicles according to the present invention.
Figure 1A:
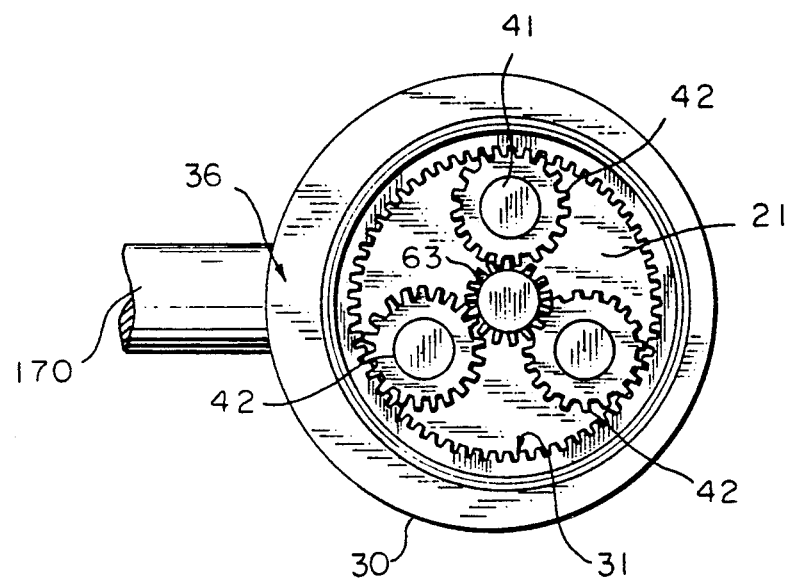
FIG. 1A shows a cross section along section line 1A—1A through a portion of the tool shown in FIG. 2.
Figure 2:
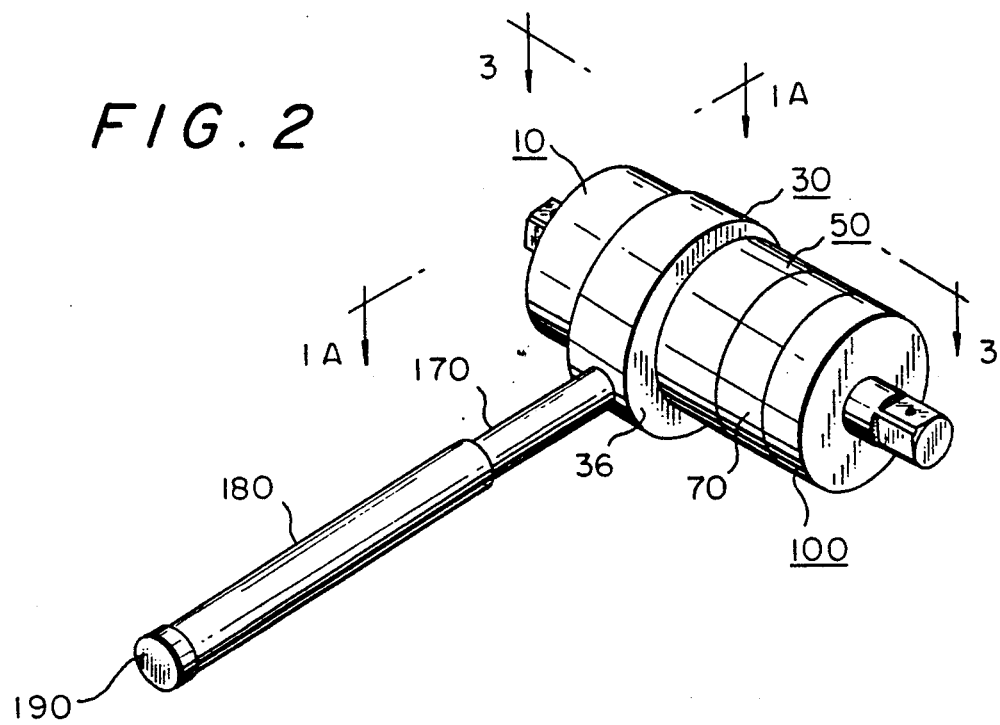
FIG. 2 is a perspective view of a tire dismounting tool in FIG. 1.
Figure 3:
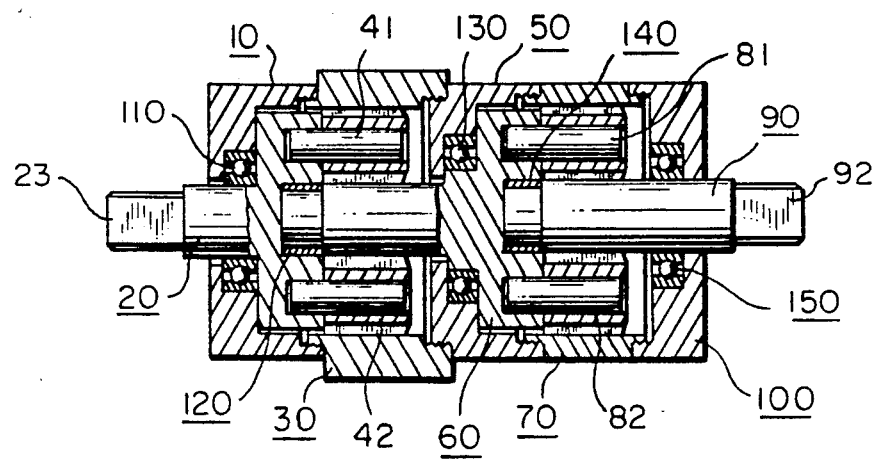
FIG. 3 is a sectional view taken along line 3—3 in FIG. 2.

Referring to FIGS. 1-3, a preferred embodiment of the present invention as shown comprising mainly a first cover 10, a first bearing 110, a first drive member 20, a first bushing 120, a first main body 30, a first transmission member 40, a second main body 50, a second bearing 130, a second drive member 60, a second bushing 140, a third main body 70, a second transmission member 80, a third drive member 90, a second cover 100, and a support member 160.

The first cover 10 is composed of a through hole 11, a first receiving space 12 and a second receiving space 13, which are disposed axially in such a manner that they are arranged in sequence from the front end thereof in accordance with the order of sizes from small to large. The second receiving space 13 passes through the rear end of the first cover 10 and is provided with a female threaded portion 14 located in the inner wall of the outer segment thereof.

The first bearing 110 is disposed securely in the first receiving space 12 of the first cover 10.

The first drive member 20 has a disk 21 and a shaft 22 extending forward from the front side of the disk 21. The shaft 22 has a front segment forming a coupling portion 23 of a square shape in its cross section. The disk 21 is further provided on rear side thereof with a pivotal hole 24 surrounded by the three peripheral holes 25. The shaft 22 is pivotally arranged in the through hole 11 of the first cover 10 and in the first bearing 110, while the coupling portion 23 is allowed to extend beyond the front side of the first cover 10.

The first bushing 120 is inserted securely into the pivotal hole 24 of the first drive member 20.

The first main body 30 comprises axially an eccentric gear hole 31 and a male threaded portion 32 located on the periphery of the front end thereof and intended to engage the female threaded portion 14 of the first cover 10. The first main body 30 is further provided in the rear end thereof with an inner threaded portion 33 adjacent to the eccentric gear hole 31. The first main body 30 is additionally provided with a screw hole 34 located at the midpoint of a sickle-shaped portion formed by virtue of the eccentricity of gear hole 31 of the first main body 30.

The first transmission member 40 comprises three pivots 41 and pinions 42 equal in number to the pivot 41. Each of the three pivots 41 is inserted securely at front end thereof into the peripheral hole 25 of the first drive member 20, while pinions 42 are pivotally disposed on the pivots 41 in such a manner that they mesh with the gear hole 31 of the first main body The second main body 50 comprises axially an axial hole 51, a third receiving space 52, and a fourth receiving space 53, which are arranged in sequence from the front end thereof according to the order of their sizes from small to large. The fourth receiving space 53 passes through the rear side of the second main body 50 and comprises a female threaded portion 54 located in the inner wall of the outermost thereof. The second main body 50 is further provided with an outer threaded portion 55 disposed on periphery of the front end thereof and intended to engage the inner threaded portion 33 of the first main body 30.

The second bearing 130 is arranged securely in the third receiving space 52 of the second main body 50.

The second drive member 60 has a disk 61 comprising a shaft 62, a first outer toothed portion 63 and a first pivot 64, which are disposed axially and forward in sequence on the front end portion thereof. The disk 61 is further provided at the center of rear end thereof with a pivotal hole 65 surrounded by the three peripheral holes 66 spaced apart at equal interval in a circular manner. In assembling the second drive member 60, the first outer toothed portion 63 is put through the axial hole 51 of the second main body 50 so as to mesh with the pinion 42 of the first transmission member 40, while the first pivot 64 is mounted pivotally in the first bushing 120.

The second bushing 140 is inserted securely into the pivotal hole 65 of the second drive member 60.

The third main body 70 is provided internally with an inner toothed portion 71. In addition, the third main body 70 is composed of a threaded portion 72 disposed on the periphery of front end thereof and of a threaded portion 73 disposed on the periphery of rear end thereof. The threaded portion 72 of the third main body 70 engages the female threaded portion 54 of the second main body 50.

The second transmission member 80 comprises three pivots 81 and pinions 82 equal in number to the pivot 81. Each of the three pivots 81 is inserted securely at front end thereof into the peripheral hole 66 of the second drive member 60 while the pinions 82 are pivotally mounted on the pivots 81 in such a manner that they mesh with the inner toothed portion 71 of the third main body 70.

The third drive member 90 has a rod 91 with a rear coupling portion 92 disposed at rear end thereof and with a second outer toothed portion 93 and a second pivot 94 which are disposed respectively at front end thereof. The second outer toothed portion 93 meshes the pinions 82 of the second transmission member 80, while the second pivot 94 is arranged pivotally in the second bushing 140.

The second cover 100 comprises an axial hole 100A, a fifth receiving space 100B and a sixth receiving space 100C, which are arranged in sequence from rear end thereof according to the order of their sizes from small to large. The sixth receiving space 100C comprises in its inner wall a female threaded portion intended to engage the threaded portion 73 located at the rear end of the third main body 70. The fifth receiving space 100B is used to accommodate a third bearing 150.

The support member 160 comprises an inner rod 170, an outer rod 180 and a plug 190. The inner rod 170 is provided internally with a threaded portion 170A intended to engage the screw hole 34 of the first main body 30. The outer rod 180 of hollow construction has an inner diameter slightly greater than the outer diameter of the inner rod 170 and is fitted over the inner rod 170 with an appropriate tightness. The plug 190 of a cap-like body is made from plastic material and has an open end and a closed end 190A provided with a small hole 190B located at the center thereof. The plug 190 is fitted over the outer end of the outer rod 180.

Figure 4:
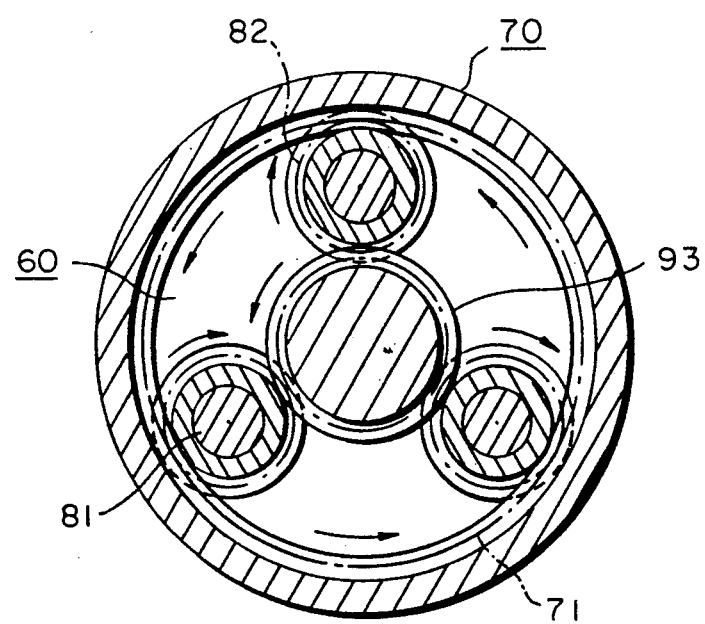
FIG. 4 is a schematic view showing a tire dismounting tool in FIG. 2 in operation.

The operation of the tire dismounting tool of the present invention described above is shown in FIG. 5, in which the coupling portion 23 of the first drive member 20 is shown being fitted over by a socket 200. In addition, a lever 300 is fastened to the rear coupling portion 92 of the third drive member 90. Thereafter, the socket 200 is fitted over the tire nut of a truck intended to be loosened and dismounted. The outer end of the outer rod 180 of the support member 160 is made to rest on the ground so as to permit the entire support member 160 to incline in relation to the ground. The lever 300 is then rotated counter-clock-wise so as to actuate the third drive member 90 to turn, as shown in FIG. 4. Accordingly, each of pinions 82 of the second transmission member 80 is driven to rotate clock-wise and to travel counter-clock-wise in the inner toothed portion 71 of the third main body 70 so as to generate a predetermined speed ratio M, which in turn causes the second drive member 60 to turn counter-clock-wise. Similarly, the first transmission member 40 generates a predetermined speed ratio N. As a result, the first drive member 20 rotates at a high speed ratio of M×N so as to generate a high torsion capable of loosening the wheel nut fitted over with the socket 200.

Figure 5:
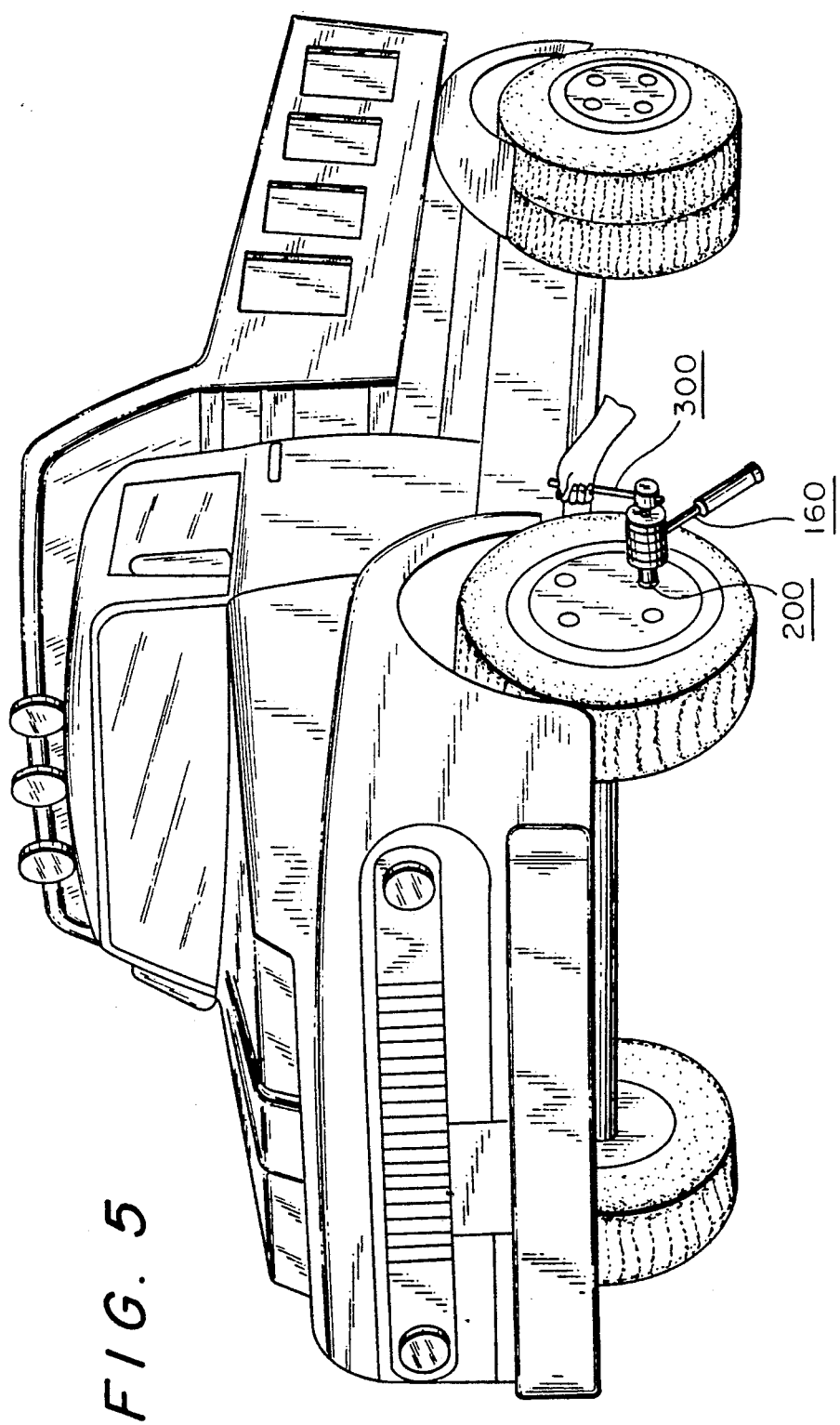
FIG. 5 is a diagram illustrating the working principles of the present invention in tighting the wheel nuts.

Upon the completion of the change of the tire, the process of tightening the wheel nuts can be carried out, as shown in FIG. 5, with the difference being that the inclined support member 160 must be placed to the left of the operator. The wheel nuts can then be tightened up by rotating the lever 300 clock-wise.

The incident of flat tire often takes place on the road, where the ground level is not always flat and can be even quite bumpy. Under such circumstance, the overall length of the support member 160 can be adjusted by sliding the outer rod 180 telescopically until such time when the best sustaining point is found. As noted alone, support member 160 is constructed so that the outer rod 180 is prevented from sliding out of the inner rod 170 accidentally due to appropriate tightness.

A greater torsion is generally required for loosening a wheel nut of heavy truck, as compared with a light motor vehicle such as a sedan. For this reason, when only one set of transmission member is used, the dimensions of main body (outer shell) and gears must be greatly increased, thereby resulting in operational difficulty. To overcome such limitation, the present invention makes use of two sets of transmission for greater torsion by virture of the tandem product of speed ratios. In addition, the present invention has another advantage that it can help the operator finish the job of changing tire faster.

The embodiment of the present invention described above is to be considered in all respects as merely illustrative and not restrictive. Accordingly, the present invention may be embodied in other specific forms without deviating from the spirit thereof. For example, the long cylindrical housing of the present invention may be composed of five main bodies and two covers, with its interior divided into three receiving spaces, each of which is provided therein with a drive member for imparting torsion and with a planetary gear. In addition, the long cylindrical housing is fastened to a support member of a predetermined length. As a result, a much greater torsion can be generated by the product of speed ratios of the three sets of planetary gears. The torsion of such magnitude so generated is quite adequate to loosen an extremely tight nut mounted on the tire of a heavy automotive vehicle. Therefore, the present invention is to be limited only by the scope of the hereinafter appended claims.

What we claim is:

1. A tire dismounting tool for large motor vehicles comprising:
   a first cover having axially a through hole and a second receiving space passing through a rear end thereof, with said through hole and said receiving space arranged in sequence from a front end of said first cover;
   a first drive member having a disk and a shaft provided at a front segment thereof with a coupling portion, with said disk disposed in said second receiving space of said first cover and with said shaft passing through said through hole of said first cover;
   a first main body having axially an eccentric gear hole and a front end fastened to said rear end of said first cover;
   a first transmission member comprising a predetermined number of pivots and pinions equal in number to said pivots fastened to a rear end of said disk in such a way that they are spaced apart in a circular manner, said pinions mounted respectively on said pivots in such a manner that they engage said gear hole of said first main body;
   a second main body having axially an axial hole progressively becoming larger from a front end thereof and a fourth receiving space passing through a rear end thereof, said second main body fastened at said front end thereof to a predetermined position of a rear end of said first main body;
   a second drive member having a disk, a shaft extending from a front end thereof, and a first outer toothed portion passing through said axial hole of said second main body so as to mesh with said pinions of said first transmission member;
   a third main body fastened at a front end thereof to said rear end of said second main body and provided therein with a circular inner toothed portion;
   a second transmission member comprising a predetermined number of pivots and pinions equal in number to said pivots fastened to a rear end of said disk of said second drive member in such a way that they are spaced apart in a circular manner, said pinions mounted respectively on said pivots in such a manner that they engage said inner toothed portion of said third main body;
   a third drive member having a rod, a second outer toothed portion and a rear coupling portion extending respectively from a front end and a rear end thereof, said second outer toothed portion engaging said pinions of said second transmission member;
   a second cover having axially and at a rear end thereof an axial hole and fastened at a front end thereof to a rear end of said third main body so as to permit said rear coupling portion of said third drive member to extend beyond said axial hole; and
   a support member of slender rod-like construction having a total length adjustable in accordance with the topographical features of the ground, with its inner end fastened to a predetermined position of a periphery of said first main body.

2. A tire dismounting tool for large motor vehicles according to claim 1 wherein said disk of said first drive member is provided at the center of a rear end thereof with a pivotal hole receiving therein a first bushing, while said first outer toothed portion of said second drive member comprises at a front end thereof a first pivot mounted pivotally in said first bushing; and wherein said disk of said second drive member is provided at the center of a rear end thereof with a pivotal hole receiving therein a second bushing, while said second outer toothed portion of said third drive member comprises at a front end thereof a second pivot mounted pivotally in said second bushing.

3. A tire dismounting tool for large motor vehicles according to claim 1 wherein said support member comprises an inner rod, a hollow outer rod and a plug, said inner rod fastened at an inner end thereof to a sickle-shaped portion of said first main body, said outer rod having an inner diameter slightly greater than the outer diameter of said inner rod so as to fit over said inner rod with appropriate tightness, said plug of plastic material having an open end and a closed end provided at the center thereof with a small hole, said plug fitted over an outer end of said outer rod.

4. A tire dismounting tool for large motor vehicles according to claim 3, wherein said first main body is provided with a screw hole of a depth disposed in said sickle-shaped portion and intended to engage a threaded portion of said inner rod.

* * * * *